(12) United States Patent
Schwartz et al.

(10) Patent No.: US 11,449,491 B2
(45) Date of Patent: Sep. 20, 2022

(54) PREVENTING A TRANSMISSION OF AN INCORRECT COPY OF A RECORD OF DATA TO A DISTRIBUTED LEDGER SYSTEM

(71) Applicant: PolySign, Inc., Oakland, CA (US)

(72) Inventors: David Schwartz, Tiburon, CA (US); Arthur Britto, San Francisco, CA (US); Anna Tong, San Francisco, CA (US); Kimon Papahadjopoulos, Oakland, CA (US); William Morris, Berkeley, CA (US); Chiranjeeb Kataki, San Francisco, CA (US); Eric Rodriguez, Pleasanton, CA (US); Conor Hanranhan, El Cerrito, CA (US)

(73) Assignee: POLYSIGN, INC., Oakland, CA (US)

( * ) Notice: Subject to any disclaimer, the term of this patent is extended or adjusted under 35 U.S.C. 154(b) by 784 days.

(21) Appl. No.: 16/247,344

(22) Filed: Jan. 14, 2019

(65) Prior Publication Data
US 2020/0226121 A1   Jul. 16, 2020

(51) Int. Cl.
*G06F 16/00* (2019.01)
*G06F 16/23* (2019.01)
(Continued)

(52) U.S. Cl.
CPC ...... *G06F 16/2365* (2019.01); *G06F 16/2379* (2019.01); *G06F 16/27* (2019.01); *H04L 9/0637* (2013.01); *H04L 9/50* (2022.05)

(58) Field of Classification Search
CPC ... G06F 16/27; G06F 16/2365; G06F 16/2379
(Continued)

(56) References Cited

U.S. PATENT DOCUMENTS 7,769,997 B2    8/2010  Dick
10,474,640 B1 * 11/2019 Roche, Jr. ........... G06F 16/2272
(Continued)

FOREIGN PATENT DOCUMENTS

KR    101891734 B1    1/2018
KR    101880935 B1    3/2018

OTHER PUBLICATIONS

International Search Report and Written Opinion for App No. PCT/US2019/068424, dated Apr. 28, 2020, 9 pages.

*Primary Examiner* — Ashish Thomas
*Assistant Examiner* — Rezwanul Mahmood
(74) *Attorney, Agent, or Firm* — Butzel Long

(57) ABSTRACT

An incorrect copy of a record of data can be prevented from being transmitted to a distributed ledger system. A first file can be received and can include information, in audio or video form, with a description of a subject matter of the record of data and with an authorization to transmit the copy to the distributed ledger system. The first file can be sent to a device. A second file can be received from the device and can include information that confirms that the description of the subject matter, included in the first file, is correct, and that confirms that an entity, which controlled production of the first file, has permission to authorize causing the copy to be transmitted to the distributed ledger system. The correct copy can be caused, based on a receipt of the first and the second files, to be transmitted to the distributed ledger system.

24 Claims, 11 Drawing Sheets

(51) Int. Cl.
  *H04L 9/06*        (2006.01)
  *G06F 16/27*       (2019.01)
  *H04L 9/00*        (2022.01)

(58) Field of Classification Search
  USPC .................................................. 707/703
  See application file for complete search history.

(56) References Cited

U.S. PATENT DOCUMENTS

| | | | |
|---|---|---|---|
| 11,025,626 B1* | 6/2021 | Todd | H04L 63/108 |
| 11,048,668 B2* | 6/2021 | Boutnaru | H04L 63/04 |
| 11,159,308 B2* | 10/2021 | Schwartz | H04L 9/3247 |
| 11,310,055 B2* | 4/2022 | Schwartz | G06Q 20/3823 |
| 2007/0255653 A1* | 11/2007 | Tumminaro | G06Q 20/3255 705/39 |
| 2009/0319425 A1* | 12/2009 | Tumminaro | G06Q 20/3223 705/42 |
| 2011/0320347 A1* | 12/2011 | Tumminaro | G06Q 20/0855 705/39 |
| 2012/0054102 A1* | 3/2012 | Schwartz | G06Q 20/386 705/44 |
| 2016/0344550 A1* | 11/2016 | Anton | H04L 63/0815 |
| 2017/0132625 A1 | 5/2017 | Kennedy | |
| 2017/0235970 A1* | 8/2017 | Conner | G06F 21/44 707/690 |
| 2017/0279783 A1* | 9/2017 | Milazzo | H04L 63/06 |
| 2017/0359374 A1* | 12/2017 | Smith | H04L 9/3236 |
| 2017/0364450 A1* | 12/2017 | Struttmann | G06F 16/9024 |
| 2018/0204213 A1* | 7/2018 | Zappier | H04L 63/10 |
| 2018/0315046 A1* | 11/2018 | Joao | G06Q 20/401 |
| 2018/0343120 A1* | 11/2018 | Andrade | H04L 9/0637 |
| 2019/0051390 A1* | 2/2019 | Shah | G06F 16/1824 |
| 2019/0065763 A1* | 2/2019 | Berg | H04L 9/3239 |
| 2019/0158594 A1* | 5/2019 | Shadmon | G06F 16/2471 |
| 2019/0172073 A1* | 6/2019 | Wiig | G06N 20/00 |
| 2019/0205558 A1* | 7/2019 | Gonzales, Jr. | G06F 21/62 |
| 2019/0278254 A1* | 9/2019 | Kumar | B33Y 50/02 |
| 2019/0311148 A1* | 10/2019 | Andrade | H04L 9/0643 |
| 2019/0318109 A1* | 10/2019 | Thomas | H04L 63/102 |
| 2019/0318129 A1* | 10/2019 | David | H04L 67/104 |
| 2019/0332921 A1* | 10/2019 | Rodriguez | H04L 63/12 |
| 2019/0334724 A1* | 10/2019 | Anton | H04L 63/18 |
| 2019/0377811 A1* | 12/2019 | Aleksander | H04L 9/0637 |
| 2019/0379531 A1* | 12/2019 | Aleksander | H04L 9/0637 |
| 2020/0013028 A1* | 1/2020 | Black | G06Q 20/40145 |
| 2020/0042721 A1* | 2/2020 | Castinado | H04L 9/3239 |
| 2020/0050686 A1* | 2/2020 | Kamalapuram | G06F 21/6218 |
| 2020/0097964 A1* | 3/2020 | Mittal | G06Q 20/4016 |
| 2020/0151038 A1* | 5/2020 | Lingamneni | G06F 8/31 |
| 2020/0159891 A1* | 5/2020 | Patel | H04L 9/3239 |
| 2020/0162236 A1* | 5/2020 | Miller | H04L 9/0643 |
| 2020/0167373 A1* | 5/2020 | Siddiqui | H04L 67/10 |
| 2020/0226121 A1* | 7/2020 | Schwartz | G06F 16/137 |
| 2020/0304288 A1* | 9/2020 | Schwartz | H04L 9/0894 |
| 2020/0357005 A1* | 11/2020 | Yang | G06V 40/168 |
| 2021/0014041 A1* | 1/2021 | Schwartz | G06Q 20/3823 |
| 2021/0073212 A1* | 3/2021 | Conley | G06F 16/27 |
| 2021/0103581 A1* | 4/2021 | Lee | G06F 16/2379 |
| 2021/0110388 A1* | 4/2021 | Gonzales, Jr. | G06Q 40/08 |
| 2021/0141909 A1* | 5/2021 | Zhai | G06F 16/1744 |
| 2021/0157954 A1* | 5/2021 | Majko-Ruben | G06F 16/1873 |
| 2021/0165915 A1* | 6/2021 | Goodwin | H04L 63/126 |
| 2021/0286803 A1* | 9/2021 | Golbin | G06F 16/2379 |
| 2022/0029801 A1* | 1/2022 | Velagapalli | H04L 9/0877 |

* cited by examiner

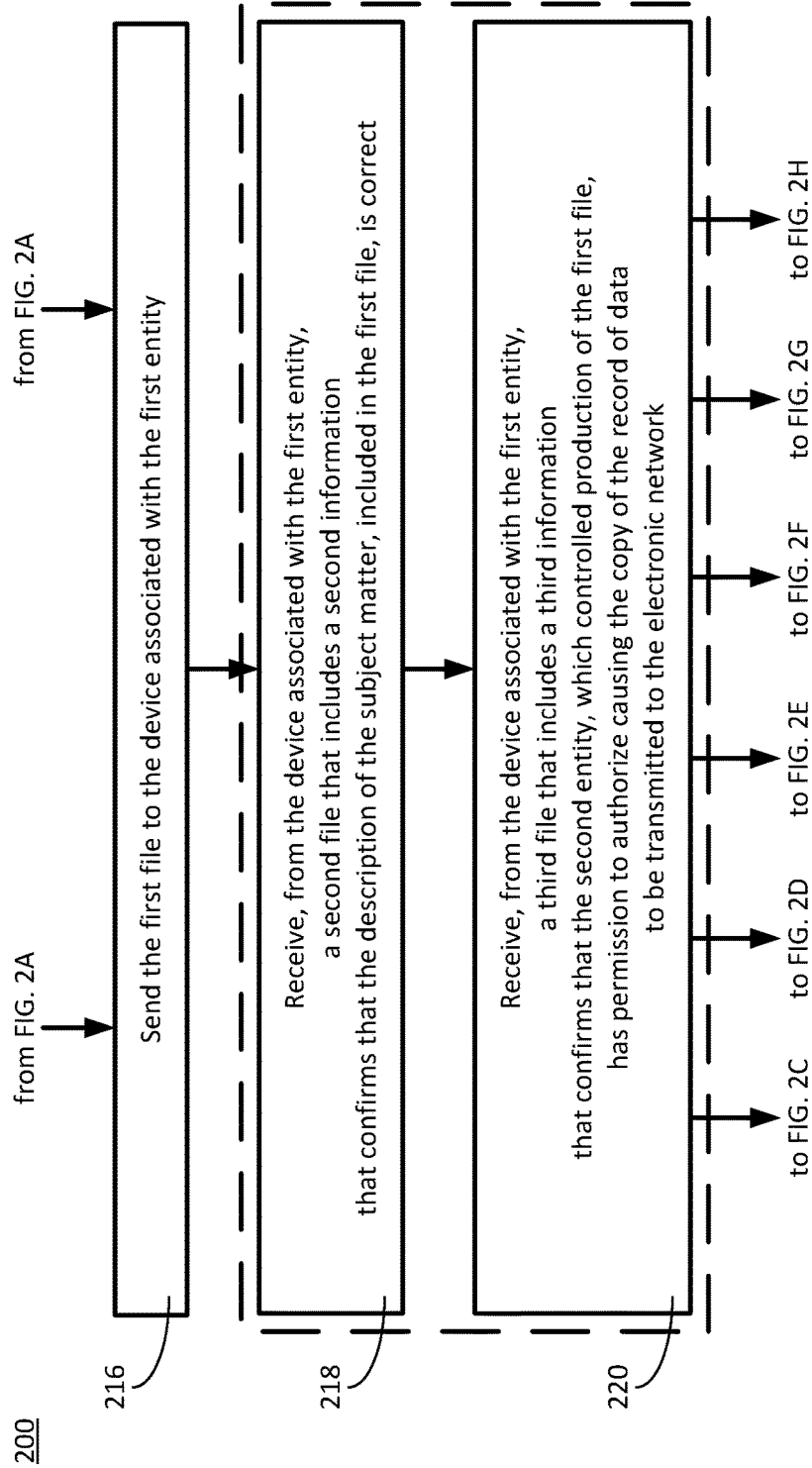

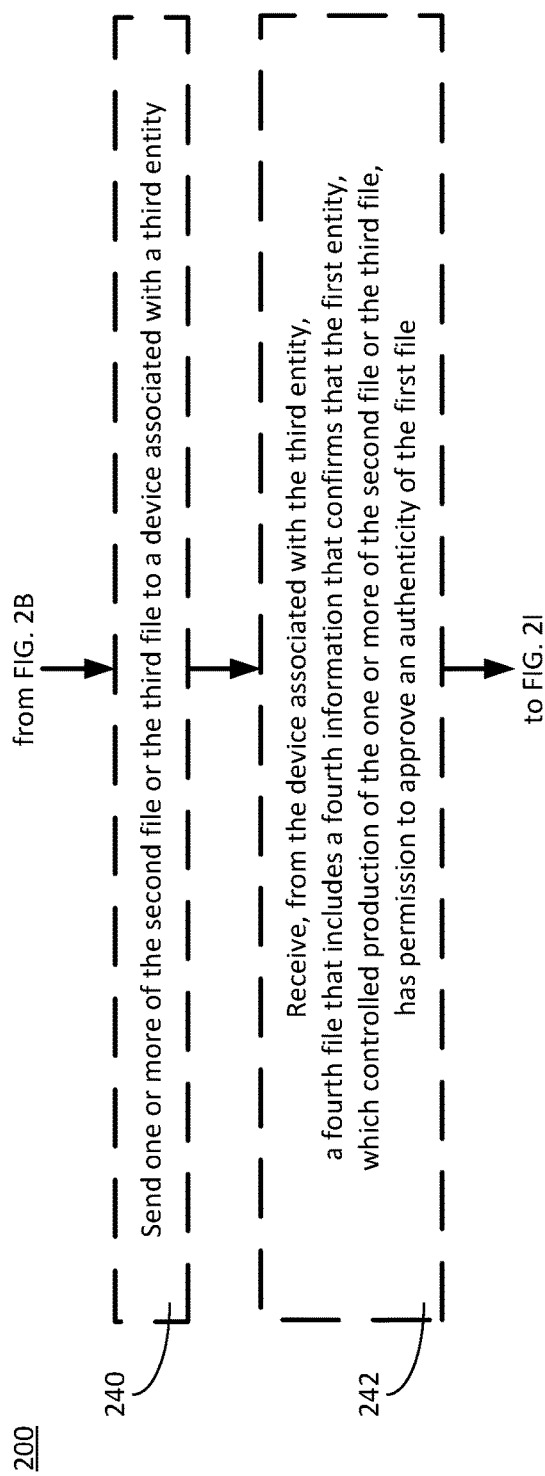

US 11,449,491 B2

PREVENTING A TRANSMISSION OF AN INCORRECT COPY OF A RECORD OF DATA TO A DISTRIBUTED LEDGER SYSTEM

BACKGROUND

A blockchain can be a database that can be used to ensure an authenticity of a record of data. The blockchain can be organized as a sequence of blocks. A block can be added to the blockchain after a discrete duration of time has elapsed since a previous block was added to the blockchain. A block can include one or more records of data received by an electronic ledger system within the discrete duration of time since the previous block was added to the blockchain. A current block can include a hash of the previous block, a timestamp, and the one or more records of data that are a subject of the current block. The hash of the previous block can be a cryptographic hash. Another hash can represent the one or more records of data that are the subject of the current block. The other hash can be, for example, a merkle tree root hash. Because a subsequent block can include a hash of the current block, etc., an alteration of a record of data included in the blockchain can be determined by reference to hashes included in subsequent blocks.

BRIEF DESCRIPTION OF THE DRAWINGS

The accompanying drawings, which are included to provide a further understanding of the disclosed technologies, are incorporated in and constitute a part of this specification. The drawings also illustrate implementations of the disclosed technologies and together with the detailed description serve to explain the principles of implementation of the disclosed technologies. No attempt is made to show structural details in more detail than may be necessary for a fundamental understanding of the disclosed technologies and the various ways in which it can be practiced.

FIGS. 2A through 2I are a flow diagram illustrating an example of a method for preventing a transmission of an incorrect copy of a record of data to an electronic network, according to the disclosed technologies.

DETAILED DESCRIPTION

Figure 1:
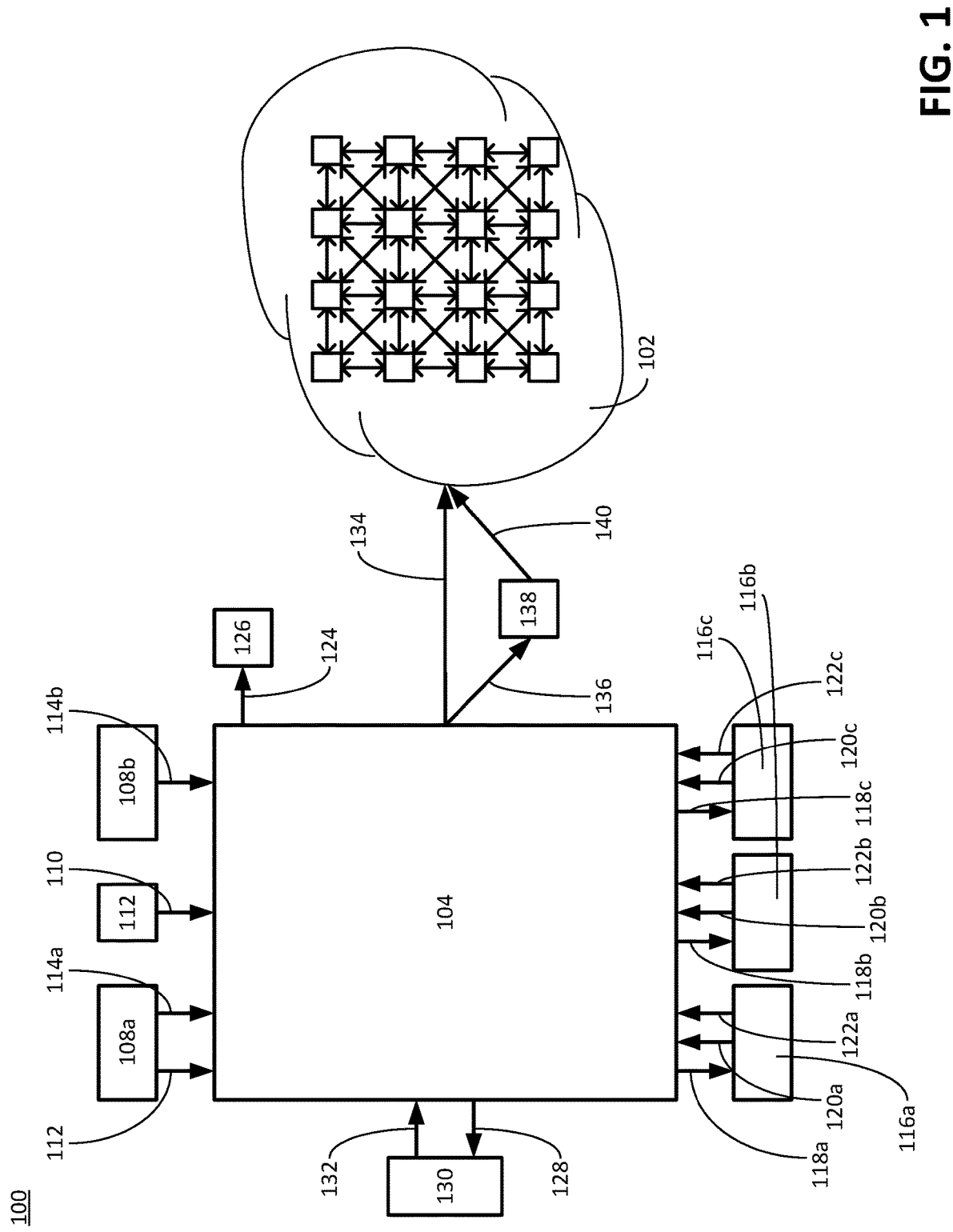
FIG. 1 is a diagram illustrating an example of an environment for preventing a transmission of an incorrect copy of a record of data to an electronic network, according to the disclosed technologies.

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

A blockchain can be a database that can be used to ensure an authenticity of a record of data. The blockchain can be organized as a sequence of blocks. A block can be added to the blockchain after a discrete duration of time has elapsed since a previous block was added to the blockchain. A block can include one or more records of data received by an electronic ledger system within the discrete duration of time since the previous block was added to the blockchain. A current block can include a hash of the previous block, a timestamp, and the one or more records of data that are a subject of the current block. The hash of the previous block can be a cryptographic hash. Another hash can represent the one or more records of data that are the subject of the current block. The other hash can be, for example, a merkle tree root hash. Because a subsequent block can include a hash of the current block, etc., an alteration of a record of data included in the blockchain can be determined by reference to hashes included in subsequent blocks.

The electronic ledger system can operate the blockchain. The electronic ledger system can include an electronic device or, alternatively, can include several electronic devices disposed in a peer-to-peer network. An electronic ledger system in which several electronic devices are disposed in a peer-to-peer network can be referred to as a distributed ledger system. Each electronic device in the distributed ledger system can be referred to as a node of the distributed ledger system. Each node can save a copy of the blockchain. In response to a block being added to the blockchain, each node can update its copy of the blockchain. A consensus algorithm can receive, from the nodes, respective copies of the blockchain. The consensus algorithm can determine a consensus about which of the respective copies of the blockchain is a correct copy of the blockchain. In response to a determination of the consensus, the nodes can update their respective copies of the blockchain to be the correct copy of the blockchain. Because a distributed ledger system can use a consensus algorithm to determine the correct copy of the blockchain, an alteration of a record of data included in a copy of the blockchain stored at a node of the distributed ledger system can be prevented from being deemed to be the correct copy of the record of data. In this manner, a distributed ledger system can be used to ensure an authenticity of a record of data.

However, the efficacy of a distributed ledger system in ensuring an authenticity of a record of data depends upon a copy of the record of data that is transmitted to the distributed ledger system being a correct copy. Particularly in the case of a record of data associated with a transaction between entities, having an incorrect copy of the record of data transmitted to the distributed ledger system can cause one or more errors in the transaction to the detriment of one or both of the entities associated with the transaction. Significantly, in response to an incorrect copy of a record of data having been transmitted to the distributed ledger system, the nodes of the distributed ledger system can needlessly waste a substantial amount of time and energy updating their respective copies of the blockchain to include the incorrect copy of the record of data. For example, an average Bitcoin transaction on the Bitcoin.org blockchain consumes about 215 kilowatt-hours of energy.

Conventional techniques for authenticating a record of data before having the record of data transmitted to the distributed ledger system are inadequate. Authentication based upon knowledge or an authenticating item (e.g., a password, a token, etc.) is insufficient because an entity, different from the entities associated with the record of data, can obtain the knowledge (e.g., password) or possession of the authenticating item (e.g., token). Although authentication based upon an inherence factor (e.g., a biometric identifier) can prevent such an entity from authenticating a record of data, such a technique still does not ensure that the entity performing the authentication of the record of data does so with correct knowledge of a subject matter of the record of data.

The disclosed technologies can prevent an incorrect copy of a record of data from being transmitted to a distributed ledger system. A first file can be received. The first file can include information, in audio form or video form, with: (1) a description of a subject matter of the record of data and (2) an authorization to cause a copy of the record of data to be transmitted to the distributed ledger system. The first file can be sent to a device. A second file can be received from the device. The second file can include information that confirms that: (1) the description of the subject matter, included in the first file, is correct, and (2) an entity, which controlled production of the first file, has permission to authorize causing the copy of the record of data to be transmitted to the distributed ledger system. The correct copy of the record of data can be caused, based on a receipt of the first file and the second file, to be transmitted to the distributed ledger system.

FIG. 1 is a diagram illustrating an example of an environment 100 for preventing a transmission of an incorrect copy of a record of data to an electronic network 102, according to the disclosed technologies. The environment 100 can include, for example, the electronic network 102 and a system 104 for preventing transmission of an incorrect copy of a record of data to the electronic network 102. The record of data can be associated with an item for which an authentication of a copy is important. For example, the record of data can be associated with a transaction, a will or testament, a document related to a quality assurance program, a document to be used as evidence in a judicial proceeding, or the like. The electronic network 102 can include a distributed ledger system. If the record of data is associated with a transaction, then, additionally or alternatively, the electronic network 102 can include one or more of an Automated Clearing House network, a payment rail network, another electronic ledger system, or the like. If the electronic network 102 is a distributed ledger system, then the record of data can be included, by the distributed ledger system, in a block to be added, by the distributed ledger system, to a blockchain.

Optionally, the system 104 can be configured to receive a copy of the record of data from a device 108a associated with a second entity. Alternatively and optionally, at 110 the system 104 can be configured to receive the copy of the record of data from a device 112. The device 112 can be different from the device 108a associated with the second entity. For example, if the record of data is associated with a transaction, the device 112 can be associated with one of the entities associated with the transaction.

At 114a, the system 104 can be configured to receive a first file. For example, the system 104 can be configured to receive the first file from the device 108a associated with the second entity. The first file can include a first information. The first information can be in audio form or video form. The first information can include a description of a subject matter of the record of data. The first information can include an authorization to cause the copy of the record of data to be transmitted to the electronic network 102. The second entity can be an individual or an organization. For example, the first information can be a video or audio recording, produced under a control of the second entity, that states, "This is Bob Smith, chief financial officer of Bigco. I hereby authorize the transfer of $7 million from the Bigco account with Empire State Bank to the account that Upstart has with First National Bank."

In a first optional implementation of the disclosed technologies, the description of the subject matter can be required to include one or more specific words or phrases. For example, if this first optional implementation requires the use of the word "authorize," then a video or audio recording that states, "This is Bob Smith, chief financial officer of Bigco. I hereby approve the transfer of $7 million from the Bigco account with Empire State Bank to the account that Upstart has with First National Bank." can be a reason to treat the first information as not including an authorization to cause the copy of the record of data to be transmitted to the electronic network 102. For example, it is possible that Bob Smith misspoke his statement. Alternatively, it is possible that Bob Smith deliberately spoke the word "approve" so that the first information would be treated as not including an authorization to cause the copy of the record of data to be transmitted to the electronic network 102. For example, Bob Smith may have been under duress because he was compelled to make the video or audio recording.

Optionally, the system 104 can be configured to determine a type of the subject matter of the record of data. For example, the system 104 can be configured to determine that the type of the subject matter of the record of data is "a withdrawal of funds from the Bigco account with Empire State Bank."

Optionally, the system 104 can be configured to determine an identity of the second entity. For example, the system 104 can be configured to determine that Bob Smith is the identity of the second entity. For example, the system 104 can be configured to determine the identity of the second entity from an identity of the device 108a associated with the second entity. Additionally or alternatively, the system 104 can be configured to determine the identity of the second entity by analyzing the first information to determine the identity of the second entity. For example, the system 104 can be configured to use image data processing techniques, face recognition techniques, audio data processing techniques, voice recognition techniques, the like, or some combination of the foregoing to determine the identity of the second entity.

Optionally, the system 104 can be configured to determine, based on the identity and the type of the subject matter, that the second entity has permission to cause the copy of the record of data to be transmitted to the electronic network 102. For example, the system 104 can be configured to determine, based on: (1) the identity of the second entity being Bob Smith and (2) the type of the subject matter of the file of software being "a withdrawal of funds from the Bigco account with Empire State Bank," that Bob Smith has permission to cause the copy of the record of data (in which the type of the subject matter is "a withdrawal of funds from the Bigco account with Empire State Bank") to be transmitted to the electronic network 102. For example, if the type of the subject matter was "a withdrawal of funds from the Bigco account with Pension Management Corporation" (the company that manages the pension funds of the employees of Bigco), then the system 104 can be configured to determine, based on the identity and the type of the subject matter, that the second entity does not have permission to cause the copy of the record of data to be transmitted to the electronic network 102.

Optionally, the system 104 can be configured to determine, based on the type of the subject matter, a device 116a associated with a first entity. The first entity can be an individual or an organization. For example, the system 104 can be configured to determine, based on the type of the subject matter of the file of software being "a withdrawal of funds from the Bigco account with Empire State Bank," that the device 116a associated with the first entity should be a device associated with Alice Jones, comptroller of Bigco.

At 118*a*, the system 104 can be configured to send the first file to the device 116*a* associated with the first entity.

The system 104 can be configured to receive, from the device 116*a* associated with the first entity, a second file as shown at 120*a*. The second file can include a second information. The second information can confirm that the description of the subject matter, included in the first file, is correct. For example, the second information can confirm that the description of the subject matter of the record of data ("the transfer of $7 million from the Bigco account with Empire State Bank to the account that Upstart has with First National Bank"), included in the first file, is correct. Optionally, the second information can be in audio form or video form.

The system 104 can be configured to receive, from the device 116*a* associated with the first entity, a third file, as shown at 122*a*. The third file can include a third information. The third information can confirm that the second entity, which controlled production of the first file, has permission to authorize causing the copy of the record of data to be transmitted to the electronic network 102. For example, the third information can confirm that the second entity (Bob Smith), which controlled production of the first file, has permission to authorize causing the copy of the record of data to be transmitted to the electronic network 102. Optionally, the third information can be in audio form or video form.

In a second optional implementation of the disclosed technologies, both the second file and the third file can be included in a combined file. The system 104 can be configured to receive the combined file.

Optionally, the system 104 can be configured to receive, from the device 116*a* associated with the first entity, a digital signature. The digital signature can identity the first entity. In a third optional implementation of the disclosed technologies, the digital signature can include a hash of the first file. For example, including the hash of the first file in the digital signature can provide confirmation that the first file, and not another file, was reviewed by the first entity.

Optionally, the system 104 can be configured to reference a digital certificate to confirm the digital signature. The digital certificate can provide an indication that the first entity is authorized to review the first file.

Optionally, in a fourth optional implementation of the disclosed technologies, the device 116*a* associated with the first entity can be a plurality of devices. A count of the plurality of devices can be a first number. The first entity can be a plurality of first entities. A count of the plurality of first entities can be a second number. The first number can be equal to the second number. Alternatively, the first number can be different from the second number. That is, more than one entity can be associated with the same device, or more than one device can be associated with the same entity. The second file can be a plurality of second files. A count of the plurality of second files can be a third number. The third file can be a plurality of third files. A count of the plurality of third files can be a fourth number. The third number can be equal to the fourth number. Alternatively, the third number can be different from the fourth number. That is, the system 104 may receive more second files than third files, or more third files than second files.

For example, the plurality of devices can include the device 116*a*, a device 116*b*, and a device 116*c*. For example, the device 116*a* can be associated with Alice Jones, comptroller of Bigco; the device 116*b* can be associated with Charlie Sanders, an accounts payable accountant at Bigco; and the device 116*c* can be associated with Dave Porter, a staff accountant at Bigco. The system 104 can be configured to send the first file to the device 116*a* as shown at 118*a*, to send the first file to the device 116*b* as shown at 118*b*, and to send the first file to the device 116*c* as shown at 118*c*. The system 104 can be configured to receive, from the device 116*a*, a first second file as shown at 120*a*, to receive, from the device 116*b*, a second second file as shown at 120*b*, and to receive, from the device 116*c*, a third second file as shown at 120*c*. The system 104 can be configured to receive, from the device 116*a*, a first third file as shown at 122*a*, to receive, from the device 116*b*, a second third file as shown at 122*b*, and to receive, from the device 116*c*, a third file as shown at 122*c*.

Optionally, in the fourth optional implementation, the system 104 can be configured to determine that the third number is greater than a threshold. That is, the number of second files that the system 104 receives is greater than a threshold. For example, if the threshold is two and the system 104 receives second files from the device 104*a*, the device 104*b*, and the device 104*c*, then the system 104 can determine that the number of second files received is greater than the threshold.

Optionally, in the fourth optional implementation, the system 104 can be further configured to determine that the fourth number is greater than the threshold. That is, the number of third files that the system 104 receives is also greater than the threshold. For example, if the threshold is two and the system 104 receives third files from the device 104*a*, the device 104*b*, and the device 104*c*, then the system 104 can determine that the number of third files received is greater than the threshold.

Optionally, in a fifth optional implementation of the disclosed technologies, the first file can be a plurality of first files. A count of the plurality of first files can be a first number. That is, in one or more situations more than one first file may need to be received by the system 104 and reviewed by the second entity in order to authorize causing the copy of the record of data to be transmitted to the electronic network 102. The second file can be a plurality of second files. A count of the plurality of second files can be a second number. The third file can be a plurality of third files. A count of the plurality of third files can be a third number. The second number can be equal to the third number. Alternatively, the second number can be different from the third number. That is, the system 104 may receive more second files than third files, or more third files than second files.

The plurality of first files can be received from a plurality of devices associated with one or more second entities. For example, the plurality of devices associated with the one or more second entities can include the device 108*a* and a device 108*b*. For example, the device 108*a* can be associated with Bob Smith, chief financial officer of Bigco; and the device 108*b* can be associated with Ellen Johnson, account manager for the Upstart account at Bigco. For example, the system 104 can be configured to receive 114*a* a first first file from the device 108*a* and to receive 114*b* a second first file from the device 108*b*.

Optionally, in the fifth optional implementation, the system 104 can be configured to determine that the second number is greater than a threshold and that the third number is greater than the threshold. That is, the number of second files and the number of third files that the system 104 receives is greater than the threshold. For example, if the threshold is one and the system 104 receives, from the device 116*a*: (1) a second file and a third file for the first file produced under the control of Bob Smith and (2) a second file and a third file for the first file produced under the control of Ellen Johnson, then the system 104 can determine that the number of second files received is greater than the threshold and that the number of third files received is greater than the threshold.

Optionally, in a sixth optional implementation of the disclosed technologies, the system 104 can be configured to cause, based on a receipt of the first file, the second file, and the third file, a digital signature to be associated with the copy of the record of data. For example, the digital signature can provide confirmation that: (1) the copy of the record of data has been authorized to be transmitted to the electronic network 102 and (2) the entity that authorized the copy of the record of data to be transmitted to the electronic network 102 has permission for such an authorization.

Optionally, in a seventh optional implementation of the disclosed technologies, the system 104 can be configured to cause one or more of the first file, the second file, or the third file to be stored in a retrieval system 126, as shown at 124. In this manner, these files can be available for future review.

Optionally, in the seventh optional implementation, the system 104 can be configured to cause a digital certificate to be associated with the first file. The digital certificate can provide an indication that the first file has been stored in the retrieval system 126 as shown at 124.

Optionally, in an eighth optional implementation of the disclosed technologies, the system 104 can be configured to send one or more of the second file or the third file to a device 130 associated with a third entity as shown at 128. The third entity can be an individual or an organization. For example, the device 130 can be associated with Fran Dunlop, a quality assurance specialist at Bigco.

Optionally, in the eighth optional implementation, the system 104 can be configured to receive, from the device 130 associated with the third entity, a fourth file as shown at 132. The fourth file can include a fourth information. The fourth information can confirm that the first entity, which controlled production of the one or more of the second file or the third file, has permission to approve an authenticity of the first file, Optionally, the fourth information can be in audio form or video form.

The system 104 can be configured to cause, based on a receipt of the first file, the second file, and the third file, the copy of the record of data to be transmitted to the electronic network 102 as shown at 134. Optionally, the system 104 can be configured to cause the copy of the record of data to be transmitted to the electronic network 102 by sending the copy of the record of data to a remote device 138 as shown at 136. The copy of the record of data can be transmitted to the electronic network 102 by the remote device 138 as shown at 140.

The system 104 can be configured to prevent, based on a lack of the receipt of one or more of the first file, the second file, or the third file, the transmission of the copy of the record of data to the electronic network 102.

If the system 104 is in the fourth optional implementation, then: (1) the system 104 can be configured to cause the copy of the record of data to be transmitted to the electronic network 102 further based on the third number being greater than the threshold and (2) the system 104 can be configured to prevent the transmission of the copy of the record of data based on one or more of the lack of the receipt of one or more of the first file, the second file, or the third file, or the third number being less than or equal to the threshold.

If, in the fourth optional implementation, the system 104 is further configured to determine that the fourth number is greater than the threshold, then: (1) the system 104 can be further configured to cause the copy of the record of data to be transmitted to the electronic network 102 further based on the fourth number being greater than the threshold and (2) the system 104 can be configured to prevent the transmission of the copy of the record of data based on one or more of the lack of the receipt of one or more of the first file, the second file, or the third file, the third number being less than or equal to the threshold, or the fourth number being less than or equal to the threshold.

If the system 104 is in the fifth optional implementation, then: (1) the system 104 can be configured to cause the copy of the record of data to be transmitted to the electronic network 102 further based on the third number being greater than the threshold and the fourth number being greater than the threshold and (2) the system 104 can be configured to prevent the transmission of the copy of the record of data based on one or more of the lack of the receipt of one or more of the first file, the second file, or the third file, the third number being less than or equal to the threshold, or the fourth number being less than or equal to the threshold.

If the system 104 is in the sixth optional implementation, then: (1) the system 104 can be configured to cause the copy of the record of data to be transmitted to the electronic network 102 further based on the digital signature being associated with the copy of the record of data and (2) the system 104 can be configured to prevent the transmission of the copy of the record of data based on one or more of the lack of the receipt of one or more of the first file, the second file, or the third file, or a lack of the digital signature being associated with the copy of the record of data.

If the system 104 is in the eighth optional implementation, then: (1) the system 104 can be configured to cause the copy of the record of data to be transmitted to the electronic network 102 further based on a receipt of the fourth file and (2) the system 104 can be configured to prevent the transmission of the copy of the record of data based on one or more of the lack of the receipt of one or more of the first file, the second file, the third file, or the fourth file.

FIGS. 2A through 2I are a flow diagram illustrating an example of a method 200 for preventing a transmission of an incorrect copy of a record of data to an electronic network, according to the disclosed technologies. For example, the record of data can be associated with a transaction, a will or testament, a document related to a quality assurance program, a document to be used as evidence in a judicial proceeding, or the like. The electronic network can include a distributed ledger system. If the record of data is associated with a transaction, then, additionally or alternatively, the electronic network can include one or more of an Automated Clearing House network, a payment rail network, another electronic ledger system, or the like. If the electronic network is a distributed ledger system, then the record of data can be included, by the distributed ledger system, in a block to be added, by the distributed ledger system, to a blockchain.

Figure 2A:
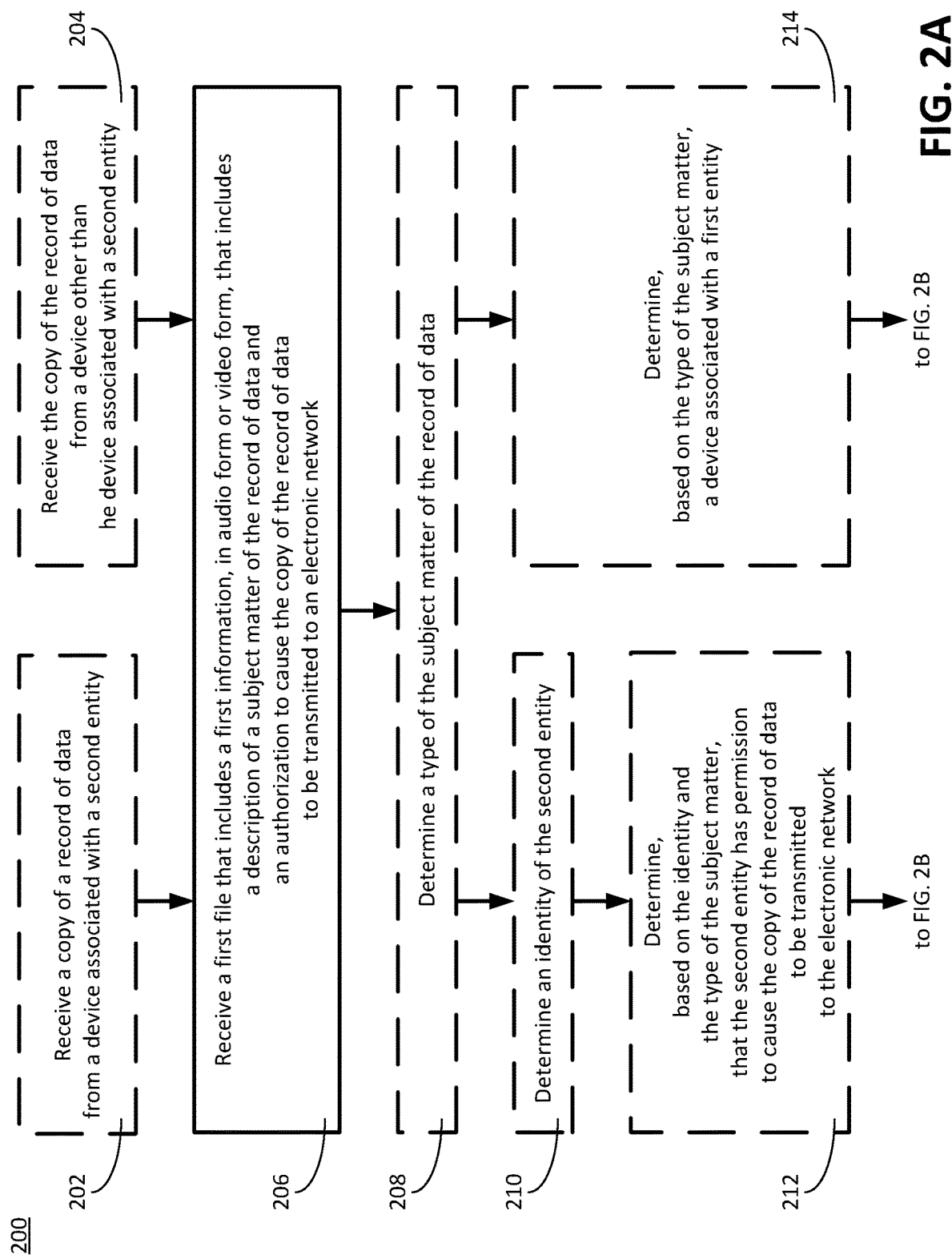

With reference to FIG. 2A, in the method 200, at an optional operation 202, a copy of the record of data can be received from a device associated with a second entity. Alternatively, at an optional operation 204, the copy of the record of data can be received from a device other than a device associated with the second entity.

At an operation 206, a first file can be received. The first file can include a first information. The first information can be in audio form or video form. The first information can include a description of a subject matter of the record of data. The first information can include an authorization to cause the copy of the record of data to be transmitted to the electronic network. In a first optional implementation of the disclosed technologies, the description of the subject matter can be required to include one or more specific words or phrases.

At an optional operation 208, a type of the subject matter of the record of data can be determined.

At an optional operation 210, an identity of the second entity can be determined. For example, the identity of the second entity can be determined from an identity of the device associated with the second entity. Additionally or alternatively, the identity of the second entity can be determined by analyzing the first information to determine the identity of the second entity. For example, the identity of the second entity can be determined using image data processing techniques, face recognition techniques, audio data processing techniques, voice recognition techniques, the like, or some combination of the foregoing.

At an optional operation 212, a state that the second entity has permission to cause the copy of the record of data to be transmitted to the electronic network can be determined based on the identity of the second entity and the type of the subject matter of the record of data.

At an optional operation 214, a device associated with a first entity can be determined based on the type of the subject matter of the record of data.

With reference to FIG. 2B, at an operation 216, the first file can be sent to the device associated with the first entity.

At an operation 218, a second file can be received from the device associated with the first entity. The second file can include a second information. The second information can confirm that the description of the subject matter, included in the first file, is correct. Optionally, the second information can be in audio form or video form.

At an operation 220, a third file can be received from the device associated with the first entity. The third file can include a third information. The third information can confirm that the second entity, which controlled production of the first file, has permission to authorize causing the copy of the record of data to be transmitted to the electronic network. Optionally, the third information can be in audio form or video form.

In a second optional implementation of the disclosed technologies, both the second file and the third file can be included in a combined file so that operation 218 and operation 220 can be combined.

Figure 2C:
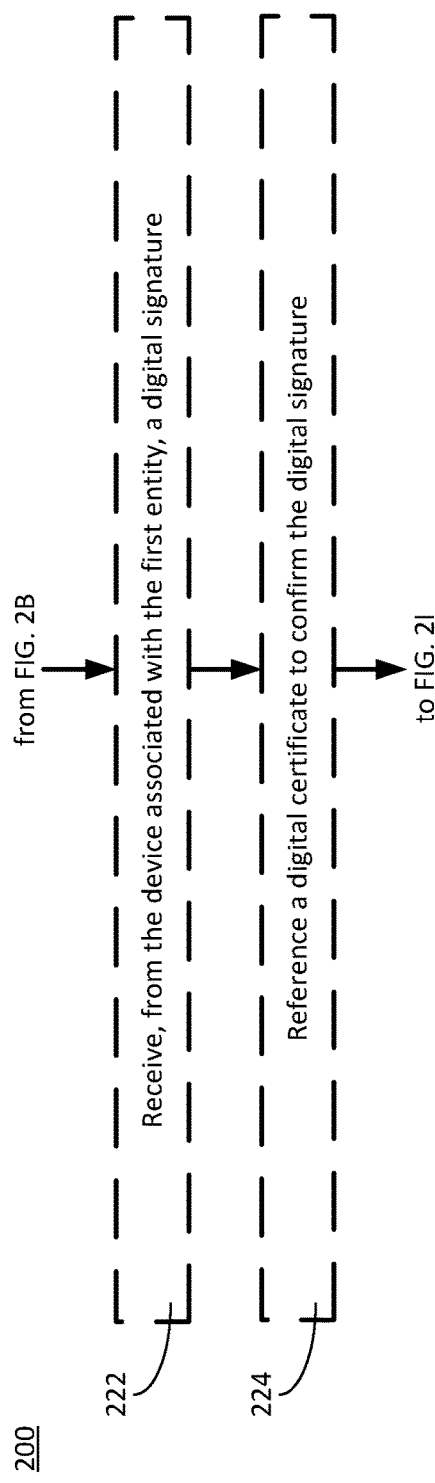

With reference to FIG. 2C, at an optional operation 222, a digital signature can be received from the device associated with the first entity. The digital signature can identify the first entity. In a third optional implementation of the disclosed technologies, the digital signature can include a hash of the first file. For example, including the hash of the first file in the digital signature can provide confirmation that the first file, and not another file, was reviewed by the first entity.

At an optional operation 224, a digital certificate can be referenced to confirm the digital signature. The digital certificate can provide an indication that the first entity is authorized to review the first file.

Optionally, in a fourth optional implementation of the disclosed technologies, the device associated with the first entity can be a plurality of devices. A count of the plurality of devices can be a first number. The first entity can be a plurality of first entities. A count of the plurality of first entities can be a second number. The first number can be equal to the second number. Alternatively, the first number can be different from the second number. That is, more than one entity can be associated with the same device, or more than one device can be associated with the same entity. The second file can be a plurality of second files. A count of the plurality of second files can be a third number. The third file can be a plurality of third files. A count of the plurality of third files can be a fourth number. The third number can be equal to the fourth number. Alternatively, the third number can be different from the fourth number. That is, more second files than third files can be received, or more third files than second files can be received.

Figure 2D:
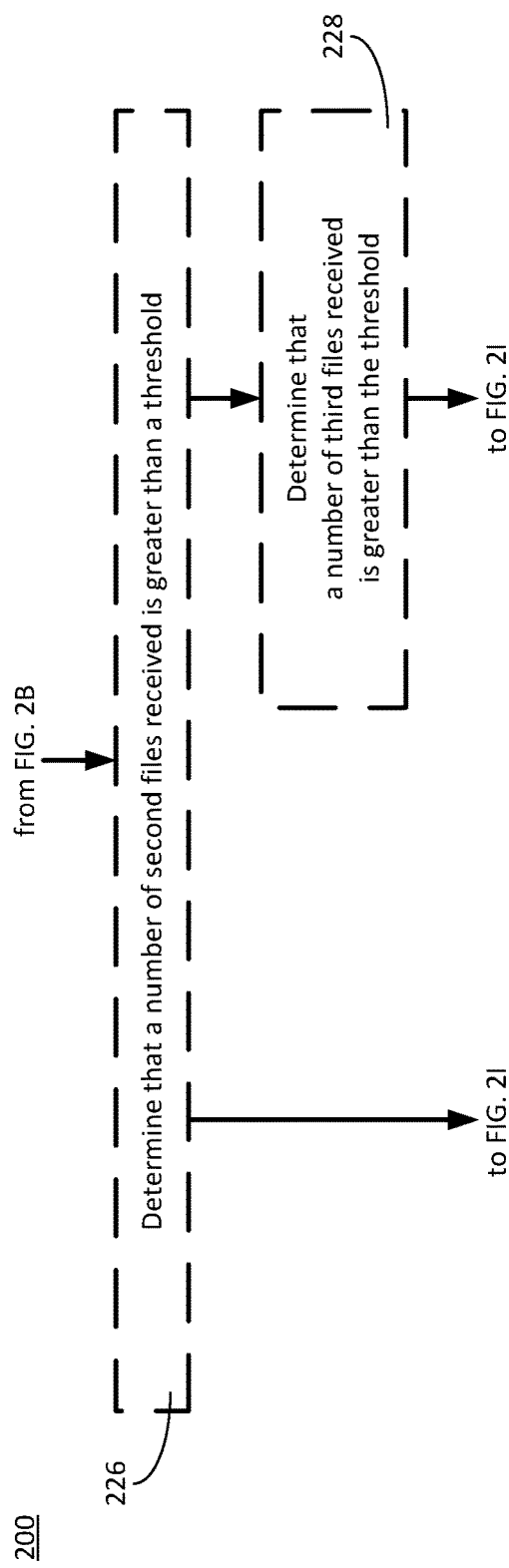

With reference to FIG. 2D, in the fourth optional implementation, at an optional operation 226, the third number can be determined to be greater than a threshold. That is, the number of second files received is greater than a threshold.

In the fourth optional implementation, at an optional operation 228, the fourth number can be determined to be greater than the threshold. That is, the number of third files received is greater than the threshold.

Optionally, in a fifth optional implementation of the disclosed technologies, the first file can be a plurality of first files. A count of the plurality of first files can be a first number. The plurality of first files can be received from a plurality of devices associated with the second entity. That is, in one or more situations more than one first file may need to be received and reviewed by the second entity in order to authorize causing the copy of the record of data to be transmitted to the electronic network. The second file can be a plurality of second files. A count of the plurality of second files can be a second number. The third file can be a plurality of third files. A count of the plurality of third files can be a third number. The second number can be equal to the third number. Alternatively, the second number can be different from the third number. That is, more second files than third files can be received, or more third files than second files can be received.

Figure 2E:
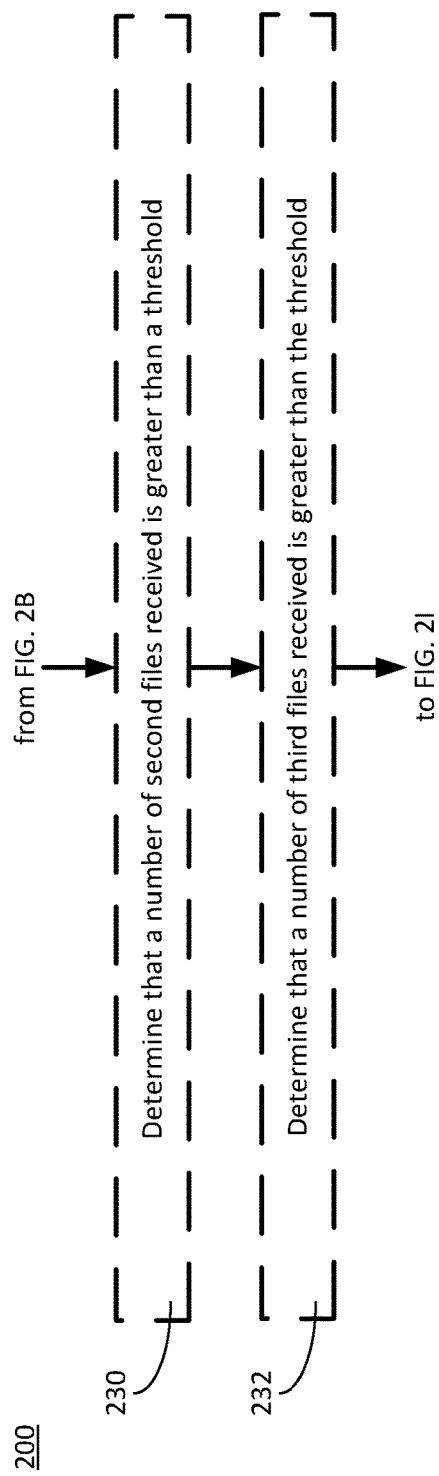

With reference to FIG. 2E, in the fifth optional implementation, at an optional operation 230, the second number can be determined to be greater than a threshold. That is, the number of second files received is greater than a threshold.

In the fifth optional implementation, at an optional operation 232, the third number can be determined to be greater than the threshold. That is, the number of third files received is greater than the threshold.

Figure 2F:
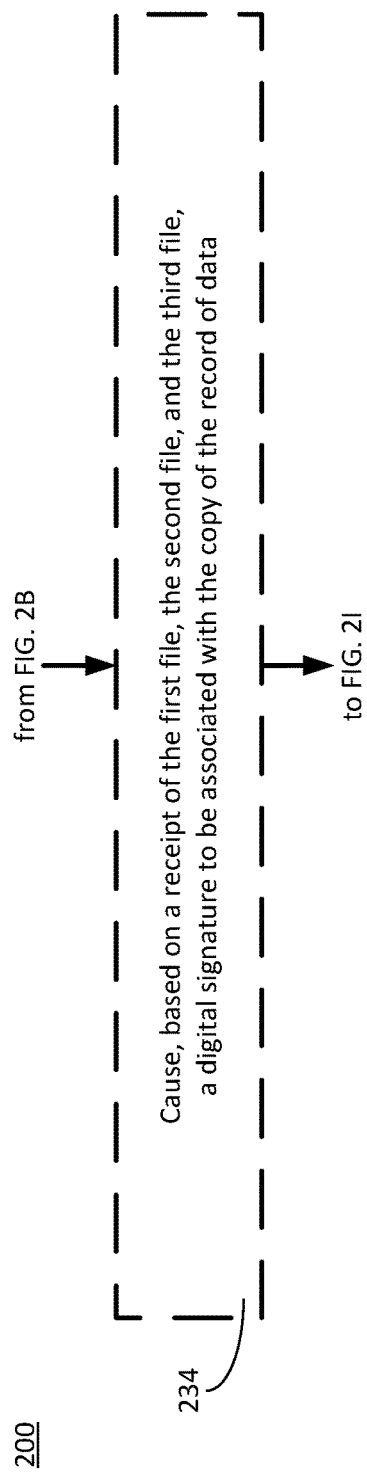

With reference to FIG. 2F, in a sixth optional implementation of the disclosed technologies, at an optional operation 234, a digital signature can be caused, based on a receipt of the first file, the second file, and the third file, to be associated with the copy of the record of data. For example, the digital signature can provide confirmation that: (1) the copy of the record of data has been authorized to be transmitted to the electronic network and (2) the entity that authorized the copy of the record of data to be transmitted to the electronic network has permission for such an authorization.

Figure 2G:
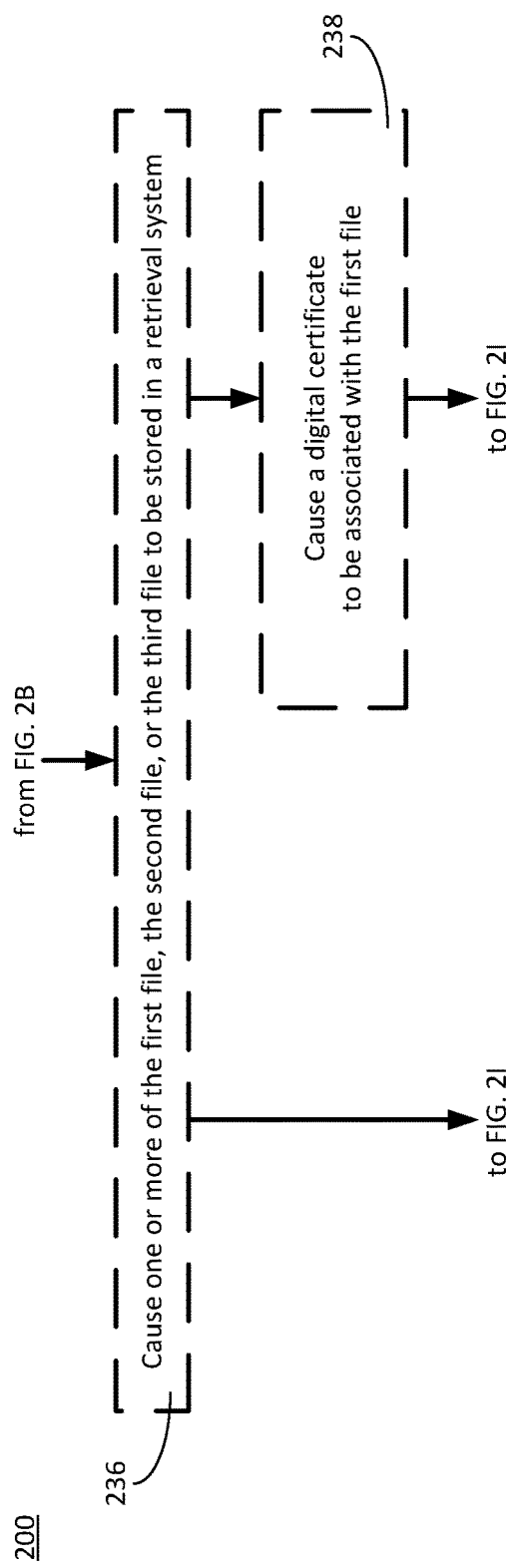

With reference to FIG. 2G, in a seventh optional implementation of the disclosed technologies, at an optional operation 236, one or more of the first file, the second file, or the third file can be caused to be stored in a retrieval system. In this manner, these files can be available for future review.

In the seventh optional implementation, at an optional operation 238, a digital certificate can be caused to be associated with the first file. The digital certificate can provide an indication that the first file has been stored in the retrieval system.

With reference to FIG. 2H, in an eighth optional implementation of the disclosed technologies, at an optional operation 240, one or more of the second file or the third file can be sent to a device associated with a third entity.

In the eighth optional implementation, at an optional operation 242, a fourth file can be received from the device associated with the third entity. The fourth file can include a fourth information. The fourth information can confirm that the first entity, which controlled production of the one or more of the second file or the third file, has permission to approve an authenticity of the first file, Optionally, the fourth information can be in audio form or video form.

Figure 2I:
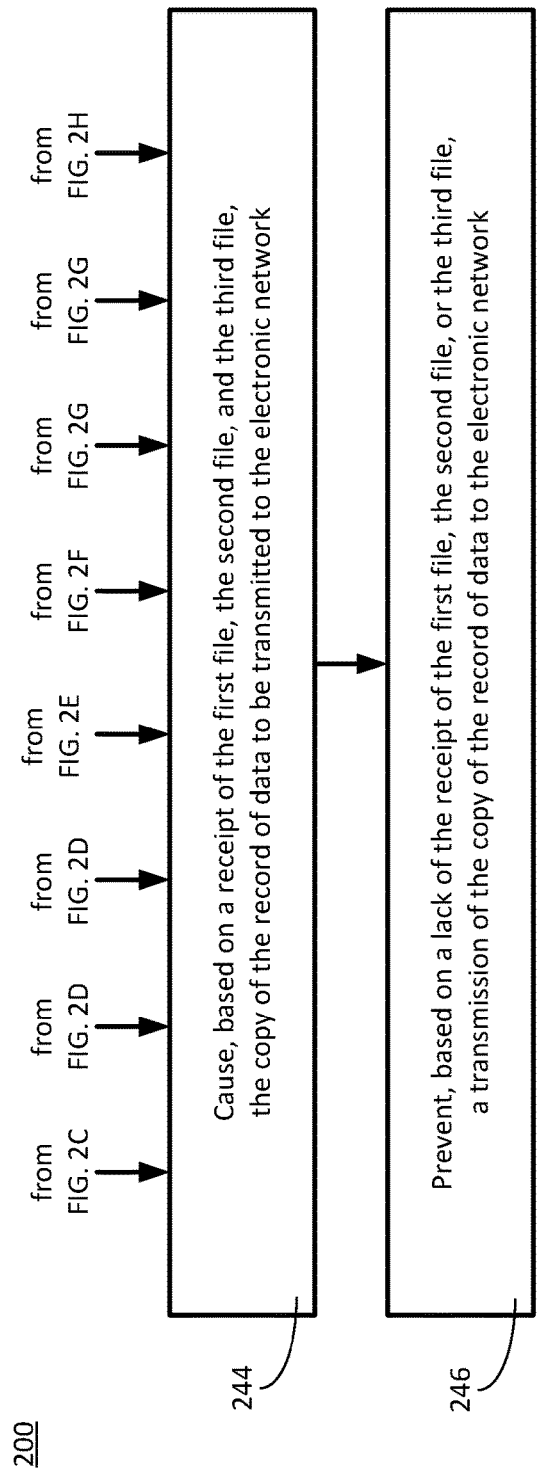

With reference to FIG. 2I, at an operation 244, the copy of the record of data can be caused, based on a receipt of the first file, the second file, and the third file, to be transmitted to the electronic network. Optionally, the copy of the record of data can be transmitted to the electronic network by sending the copy of the record of data to a remote device. The copy of the record of data can be transmitted to the electronic network by the remote device.

At an operation 246, the transmission of the copy of the record of data to the electronic network can be prevented based on a lack of the receipt of one or more of the first file, the second file, or the third file.

If operations in the method 200 are performed according to the fourth optional implementation, then: (1) the copy of the record of data can be caused to be transmitted to the electronic network further based on the third number being greater than the threshold and (2) the transmission of the copy of the record of data to the electronic network can be prevented based on one or more of the lack of the receipt of one or more of the first file, the second file, or the third file, or the third number being less than or equal to the threshold.

If operations in the method 200 performed according to the fourth optional implementation include determining that the fourth number is greater than the threshold, then: (1) the copy of the record of data can be caused to be transmitted to the electronic network further based on the fourth number being greater than the threshold and (2) the transmission of the copy of the record of data to the electronic network can be prevented based on one or more of the lack of the receipt of one or more of the first file, the second file, or the third file, the third number being less than or equal to the threshold, or the fourth number being less than or equal to the threshold.

If operations in the method 200 are performed according to the fifth optional implementation, then: (1) the copy of the record of data can be caused to be transmitted to the electronic network further based on the third number being greater than the threshold and the fourth number being greater than the threshold and (2) the transmission of the copy of the record of data to the electronic network can be prevented based on one or more of the lack of the receipt of one or more of the first file, the second file, or the third file, the third number being less than or equal to the threshold, or the fourth number being less than or equal to the threshold.

If operations in the method 200 are performed according to the sixth optional implementation, then: (1) the copy of the record of data can be caused to be transmitted to the electronic network further based on the digital signature being associated with the copy of the record of data and (2) the transmission of the copy of the record of data to the electronic network can be prevented based on one or more of the lack of the receipt of one or more of the first file, the second file, or the third file, or a lack of the digital signature being associated with the copy of the record of data.

If operations in the method 200 are performed according to the eighth optional implementation, then: (1) the copy of the record of data can be caused to be transmitted to the electronic network further based on a receipt of the fourth file and (2) the transmission of the copy of the record of data to the electronic network can be prevented based on the lack of the receipt of one or more of the first file, the second file, the third file, or the fourth file.

In general, in light of the technologies described above, one of skill in the art understands that technologies to prevent transmission of an incorrect copy of a record of data to an electronic network can include any combination of some or all of the foregoing configurations.

Figure 3:
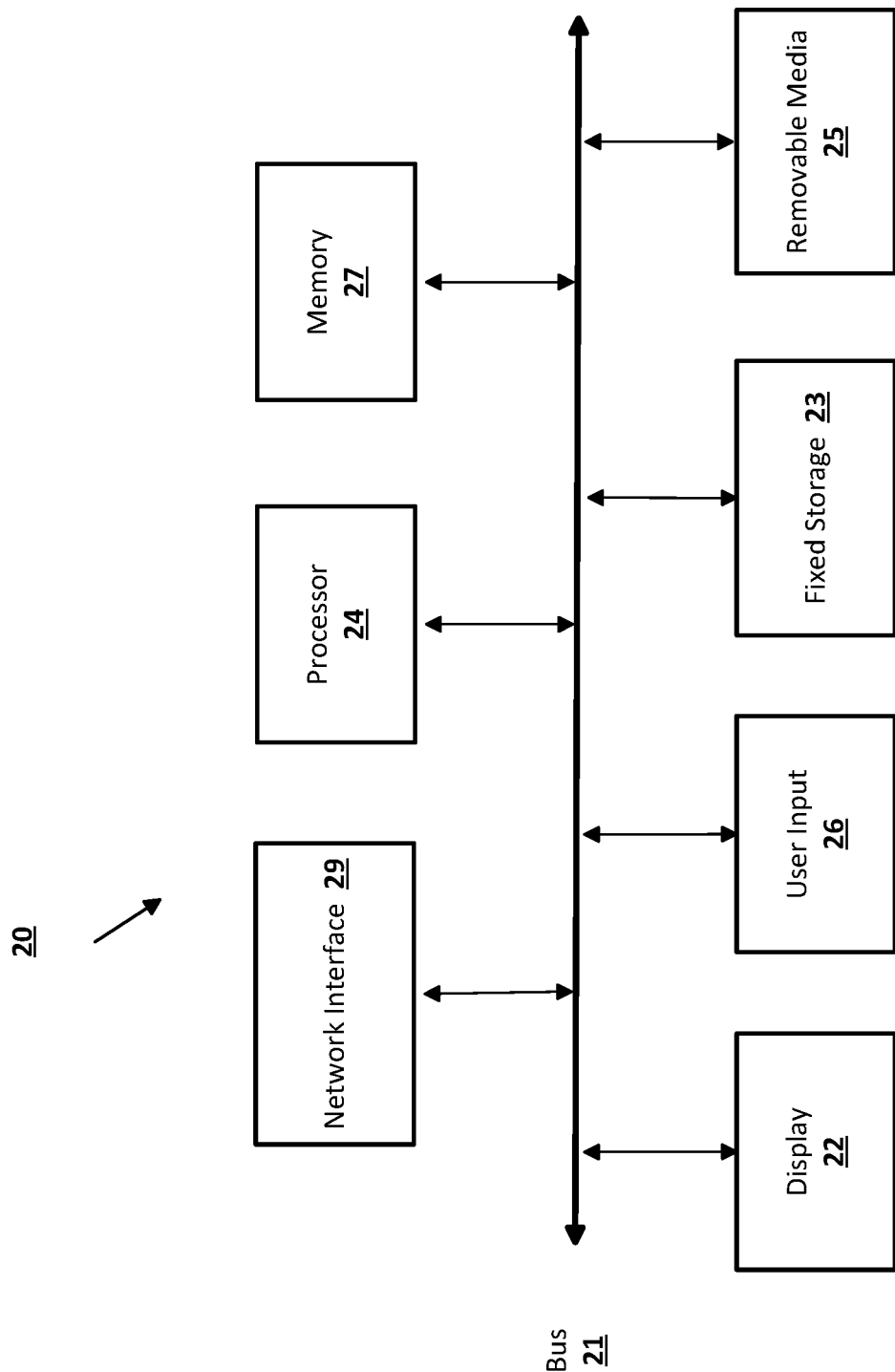
FIG. 3 illustrates an example computing device suitable for implementing configurations of the disclosed technologies.

Configurations of the disclosed technologies may be implemented in and used with a variety of component and network architectures. FIG. 3 illustrates an example computing device 20 suitable for implementing configurations of the disclosed technologies. The device 20 can be, for example, a desktop or laptop computer, or a mobile computing device such as a smart phone, tablet, or the like. The device 20 can include a bus 21 (which can interconnect major components of the computer 20, such as a central processor 24), a memory 27 (such as random-access memory (RAM), read-only memory (ROM), flash RAM, or the like), a user display 22 (such as a display screen), a user input interface 26 (which can include one or more controllers and associated user input devices such as a keyboard, mouse, touch screen, and the like), a fixed storage 23 (such as a hard drive, flash storage, and the like), a removable media component 25 (operative to control and receive an optical disk, flash drive, and the like), and a network interface 29 operable to communicate with one or more remote devices via a suitable network connection.

The bus 21 can allow data communication between the central processor 24 and one or more memory components, which can include RAM, ROM, and other memory, as previously noted. Typically RAM can be the main memory into which an operating system and application programs are loaded. A ROM or flash memory component can contain, among other code, the basic input-output system (BIOS) which can control basic hardware operation such as the interaction with peripheral components. Applications resident with the computer 20 can generally be stored on and accessed via a computer readable medium, such as a hard disk drive (e.g., fixed storage 23), an optical drive, floppy disk, or other storage medium.

The fixed storage 23 can be integral with the computer 20 or can be separate and accessed through other interfaces. The network interface 29 can provide a direct connection to a remote server via a wired or wireless connection. The network interface 29 can provide such connection using any suitable technique and protocol as is readily understood by one of skill in the art, including digital cellular telephone, WiFi™, Bluetooth®, near-field, and the like. For example, the network interface 29 can allow the computer to communicate with other computers via one or more local, wide-area, or other communication networks, as described in further detail below.

Many other devices or components (not shown) can be connected in a similar manner (e.g., document scanners, digital cameras and so on). Conversely, all of the components illustrated in FIG. 3 need not be present to practice the disclosed technologies. The components can be interconnected in different ways from that illustrated. The operation of a computer such as that illustrated in FIG. 3 is readily known in the art and is not discussed in detail in this application. Code to implement the disclosed technologies can be stored in computer-readable storage media such as one or more of the memory 27, fixed storage 23, removable media 25, or on a remote storage location.

More generally, various configurations of the presently disclosed technologies can include or be realized in the form of computer-implemented processes and apparatuses for practicing those processes. Configurations also can be realized in the form of a computer program product having computer program code containing instructions embodied in non-transitory and/or tangible media, such as floppy diskettes, CD-ROMs, hard drives, universal serial bus (USB) drives, or any other machine readable storage medium, such that when the computer program code is loaded into and executed by a computer, the computer becomes an apparatus for practicing configurations of the disclosed technologies. Configurations also can be realized in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing configurations of the disclosed technologies. When implemented on a general-purpose microprocessor, the computer program code segments configure the microprocessor to create specific logic circuits.

In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Configurations can be implemented using hardware that can include a processor, such as a general purpose microprocessor and/or an application-specific integrated circuit (ASIC) that embodies all or part of the techniques according to configurations of the disclosed technologies in hardware and/or firmware. The processor can be coupled to memory, such as RAM, ROM, flash memory, a hard disk or any other device capable of storing electronic information. The memory can store instructions adapted to be executed by the processor to perform the techniques according to configurations of the disclosed technologies.

The foregoing description, for purpose of explanation, has been described with reference to specific configurations. However, the illustrative discussions above are not intended to be exhaustive or to limit configurations of the disclosed technologies to the precise forms disclosed. Many modifications and variations are possible in view of the above teachings. The configurations were chosen and described in order to explain the principles of configurations of the disclosed technologies and their practical applications, to thereby enable others skilled in the art to utilize those configurations as well as various configurations with various modifications as may be suited to the particular use contemplated.

The invention claimed is:

1. A method for preventing a transmission of an incorrect copy of a record of data to a distributed ledger system, the method comprising:
receiving, by a processor, a first file, the first file including a first information, wherein the first information:
is in at least one of audio form or video form,
includes a description of a subject matter of the record of data, and
includes an authorization to cause a copy of the record of data to be transmitted to the distributed ledger system;
sending, by the processor, the first file to a device associated with a first entity;
receiving, by the processor and from the device associated with the first entity, a second file, the second file including a second information, wherein the second information confirms that the description of the subject matter, included in the first file, is correct;
receiving, by the processor and from the device associated with the first entity, a third file, the third file including a third information, wherein the third information confirms that a second entity, which controlled production of the first file, has permission to authorize causing the copy of the record of data to be transmitted to the distributed ledger system;
causing, by the processor and based on a receipt of the first file, the second file, and the third file, the copy of the record of data to be transmitted to the distributed ledger system; and
preventing, by the processor and based on a lack of the receipt of at least one of the first file, the second file, or the third file, the transmission of the copy of the record of data to the distributed ledger system.

2. The method of claim 1, wherein the record of data is associated with a transaction.

3. The method of claim 1, wherein the record of data is to be included, by the distributed ledger system, in a block to be added, by the distributed ledger system, to a blockchain.

4. The method of claim 1, wherein the receiving the second file and the receiving the third file comprise receiving a combined file, the combined file including the second file and the third file.

5. The method of claim 1, further comprising receiving, by the processor, the copy of the record of data from a device associated with the second entity.

6. The method of claim 1, further comprising receiving, by the processor, the copy of the record of data from a device other than a device associated with the second entity.

7. The method of claim 1, wherein at least one of the second information or the third information is in the at least one of audio form or video form.

8. The method of claim 1, further comprising:
determining, by the processor, a type of the subject matter of the record of data;
determining, by the processor, an identity of the second entity; and
determining, by the processor and based on the identity and the type of the subject matter, that the second entity has permission to cause the copy of the record of data to be transmitted to the distributed ledger system.

9. The method of claim 8, wherein the determining the identity of the second entity comprises analyzing the first information to determine the identity of the second entity.

10. The method of claim 1, further comprising:
determining, by the processor, a type of the subject matter of the record of data; and
determining, by the processor and based on the type of the subject matter, the device associated with the first entity.

11. The method of claim 1, further comprising:
receiving, by the processor and from the device associated with the first entity, a digital signature; and
referencing, by the processor, a digital certificate to confirm the digital signature.

12. The method of claim 11, wherein the digital signature includes a hash of the first file.

13. The method of claim 1, wherein:
the device associated with the first entity comprises a plurality of devices, a count of the plurality of devices being a first number;

the first entity comprises a plurality of first entities, a count of the plurality of first entities being a second number;
the second file comprises a plurality of second files, a count of the plurality of second files being a third number; and
the third file comprises a plurality of third files, a count of the plurality of third files being a fourth number.

14. The method of claim 13, further comprising determining, by the processor, that the third number is greater than a threshold, wherein:
the causing the copy of the record of data to be transmitted to the distributed ledger system is further based on the third number being greater than the threshold; and
the preventing the transmission of the copy of the record of data is based on at least one of the lack of the receipt of at least one of the first file, the second file, or the third file, or the third number being less than or equal to the threshold.

15. The method of claim 14, further comprising determining, by the processor, that the fourth number is greater than the threshold, wherein:
the causing the copy of the record of data to be transmitted to the distributed ledger system is further based on the fourth number being greater than the threshold; and
the preventing the transmission of the copy of the record of data is based on at least one of the lack of the receipt of at least one of the first file, the second file, or the third file, the third number being less than or equal to the threshold, or the fourth number being less than or equal to the threshold.

16. The method of claim 1, wherein:
the first file comprises a plurality of first files, a count of the plurality of first files being a first number;
the second file comprises a plurality of second files, a count of the plurality of second files being a second number; and
the third file comprises a plurality of third files, a count of the plurality of third files being a third number.

17. The method of claim 16, further comprising:
determining, by the processor, that the second number is greater than a threshold; and
determining, by the processor, that the third number is greater than the threshold, wherein:
the causing the copy of the record of data to be transmitted to the distributed ledger system is further based on the third number being greater than the threshold and the fourth number being greater than the threshold; and
the preventing the transmission of the copy of the record of data is based on at least one of the lack of the receipt of at least one of the first file, the second file, or the third file, the third number being less than or equal to the threshold, or the fourth number being less than or equal to the threshold.

18. The method of claim 1, wherein the causing the copy of the record of data to be transmitted to the distributed ledger system comprises sending the copy of the record of data to a remote device, the copy of the record of data to be transmitted to the distributed ledger system by the remote device.

19. The method of claim 1, further comprising causing, by the processor and based on a receipt of the first file, the second file, and the third file, a digital signature to be associated with the copy of the record of data, wherein:
the causing the copy of the record of data to be transmitted to the distributed ledger system is further based on the digital signature being associated with the copy of the record of data; and
the preventing the transmission of the copy of the record of data is based on at least one of the lack of the receipt of at least one of the first file, the second file, or the third file, or a lack of the digital signature being associated with the copy of the record of data.

20. The method of claim 1, further comprising causing, by the processor, at least one of the first file, the second file, or the third file to be stored in a retrieval system.

21. The method of claim 20, further comprising causing, by the processor, a digital certificate to be associated with the first file, the digital certificate providing an indication that the first file has been stored in the retrieval system.

22. The method of claim 1, further comprising:
sending, by the processor, at least one of the second file or the third file to a device associated with a third entity; and
receiving, by the processor and from the device associated with the third entity, a fourth file, the fourth file including a fourth information, wherein the fourth information confirms that the first entity, which controlled production of the at least one of the second file or the third file, has permission to approve an authenticity of the first file,
wherein the causing the copy of the record of data to be transmitted to the distributed ledger system is further based on a receipt of the fourth file; and
the preventing the transmission of the copy of the record of data is based on the lack of the receipt of at least one of the first file, the second file, the third file, or the fourth file.

23. A non-transitory computer-readable medium storing computer code for controlling a processor to cause the processor to prevent a transmission of an incorrect copy of a record of data to a distributed ledger system, the computer code including instructions to cause the processor to:
receive a first file, the first file including a first information, wherein the first information:
is in at least one of audio form or video form,
includes a description of a subject matter of the record of data, and
includes an authorization to cause a copy of the record of data to be transmitted to the distributed ledger system;
send the first file to a device associated with a first entity;
receive, from the device associated with the first entity, a second file, the second file including a second information, wherein the second information confirms that the description of the subject matter, included in the first file, is correct;
receive, from the device associated with the first entity, a third file, the third file including a third information, wherein the third information confirms that a second entity, which controlled production of the first file, has permission to authorize causing the copy of the record of data to be transmitted to the distributed ledger system;
cause, based on a receipt of the first file, the second file, and the third file, the copy of the record of data to be transmitted to the distributed ledger system; and
prevent, based on a lack of the receipt of at least one of the first file, the second file, or the third file, the transmission of the copy of the record of data to the distributed ledger system.

24. A system for preventing a transmission of an incorrect copy of a record of data to a distributed ledger system, the system comprising:
a memory configured to store a first file, a second file, and a third file; and
a processor configured to:
receive the first file, the first file including a first information, wherein the first information:
is in at least one of audio form or video form,
includes a description of a subject matter of the record of data, and
includes an authorization to cause a copy of the record of data to be transmitted to the distributed ledger system;
send the first file to a device associated with a first entity;
receive, from the device associated with the first entity, the second file, the second file including a second information, wherein the second information confirms that the description of the subject matter, included in the first file, is correct;
receive, from the device associated with the first entity, the third file, the third file including a third information, wherein the third information confirms that a second entity, which controlled production of the first file, has permission to authorize causing the copy of the record of data to be transmitted to the distributed ledger system;
cause, based on a receipt of the first file, the second file, and the third file, the copy of the record of data to be transmitted to the distributed ledger system; and
prevent, based on a lack of the receipt of at least one of the first file, the second file, or the third file, the transmission of the copy of the record of data to the distributed ledger system.

* * * * *